US008601091B2

(12) United States Patent
Venouss

(10) Patent No.: US 8,601,091 B2
(45) Date of Patent: Dec. 3, 2013

(54) METHOD AND SYSTEM FOR AUTOMATING NETWORK ENGINEERING

(75) Inventor: Yavar Venouss, Hillsborough, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 511 days.

(21) Appl. No.: 12/333,446

(22) Filed: Dec. 12, 2008

(65) Prior Publication Data

US 2010/0153527 A1 Jun. 17, 2010

(51) Int. Cl.
G06F 15/16 (2006.01)
G06F 15/177 (2006.01)

(52) U.S. Cl.
USPC .......................................... 709/217; 709/221

(58) Field of Classification Search
USPC .................. 709/217–221, 223–225, 229; 455/423–424, 446; 398/25; 713/100; 370/254; 715/735–738, 740–741, 715/743–744
See application file for complete search history.

(56) References Cited

U.S. PATENT DOCUMENTS

| | | | |
|---|---|---|---|
| 6,496,858 B1* | 12/2002 | Frailong et al. | 709/221 |
| 7,310,664 B1* | 12/2007 | Merchant et al. | 709/220 |
| 2002/0155830 A1* | 10/2002 | Iyer | 455/424 |
| 2005/0041600 A1* | 2/2005 | Moffatt et al. | 370/254 |
| 2006/0059253 A1* | 3/2006 | Goodman et al. | 709/223 |
| 2009/0271504 A1* | 10/2009 | Ginter et al. | 709/220 |

* cited by examiner

Primary Examiner — Peling Shaw

(57) ABSTRACT

A method and system of an embodiment may include receiving network device information associated with a network device, parsing the network device information, identifying one or more network device attributes associated with the network device from the parsed network device information, displaying via a user interface, user information associated with the one or more identified network device attributes, receiving one or more user commands via the user interface, and translating, by a command interpreter module, the one or more user commands into one or more network device executable commands.

20 Claims, 13 Drawing Sheets

|   | A | B | C |
|---|---|---|---|
| 1 | Create Menu | | |
| 2 | | | |
| 3 | Section | | |
| 4 | Parser Section | Parser Flag | |
| 5 | Location of Files | \\Pne fileserv1\postsales\M\jones\LCE Folders\IP spreadsheet\Configs\ | |
| 6 | Config Directory | \\Pne fileserv1\postsales\M\jones\LCE Folders\IP spreadsheet\Configs\ | |

Fig. 8b

|    |                          |                                  |
|----|--------------------------|----------------------------------|
| 87 | x                        | Cancel                           |
| 88 | Automation               | Value                            |
| 89 | Ex. System               | jsmith-d4                        |
| 90 | Domain                   |                                  |
| 91 | External System 1 Prompt | abcd04-snmcpe1:~>                |
| 92 | Interactive Templates    | No                               |
| 93 | Log Directory            | c:\secure crt\                   |
| 94 | Temp Directory           |                                  |
| 95 | Template Name            | Get Configs for Existing Device  |
| 96 | Automation Directory     | \\pne fileserv1\ene\automation\  |
| 97 | .out File Directory      | c:\secure crt\                   |
| 98 | Template Directory       |                                  |
| 99 | Version Control          |                                  |

Fig. 8c

|   | A |
|---|---|
| 1 | |
| 2 | Fix Enable Passwords |
| 3 | Get Config for Existing Device |

Fig. 11a

|   | A | B | C |
|---|---|---|---|
| 1 | Device Name: | 100.10.110.005 | Cached ID |
| 2 | DNS Name: | | smith-arg1a-123456 |
| 3 | Management IP: | 100.10.110.006 | smith-arg1b-123457 |
| 4 | Management Interface: | Loopback0 | smith-arg2-123458 |
| 5 | Model: | 2610XM | smith-auk1-123459 |
| 6 | Device Type: | Router | smith-bcn1-123450 |
| 7 | Street Address: | | smith-bei2a-123451 |
| 8 | City: | | smith-bei2b-123452 |
| 9 | State: | | smith-bir2-123453 |
| 10 | IOS Version: | 12.3(23) | smith-bkk1-123454 |
| 11 | Show Template ☐ Use Default Template ▼ | Export This Template | Deliver This Template |
| 12 | Show All Templates ▲ | Export All Templates | Remove Directives |
| 13 | Connect via Authentication System (AS) | | |

(Cached ID column continues: smith-bkk2-123455, smith-bog1-111111, smith-bog2-111112, smith-brz1a-111113, smith-brz1b-111114, smith-ccs1-111116, smith-ccs2-111115, smith-che1-111119)

Fig. 11b

|   | | | |
|---|---|---|---|
| 1 | Show Template ☐ Use Default Template ▼ | Export This Template | Deliver This Template | Clear All Fields |
| 2 | Show All Templates ▲ | Export All Templates | Remove Directives | Calculate All Fields |
| 3 | Connect via Authentication System (AS) | | | ▼ < Select a Template |
| 4 | [default_timeout=30] | | | Get Config for Existing Device |
| 5 | [delete=both] | | | Get Config for New Device |
| 6 | [ssh=cmds] | | | Connect via AS |
| 7 | d4[prompt=pdcd04=snmcpel:~>][jump=device_connect][prompt=password:] | | | Connect via Modem |
| 8 | {AS Password}[prompt=pdcd04-snmcpel:~>] | | | Get Customer Info |
| 9 | [label=device_connect] | | | Ping Test |

Fig. 12a

| | A | B | C | D | G | R | S | U |
|---|---|---|---|---|---|---|---|---|
| 1 | | | Calculate Site ID | | | | | |
| 2 | Clear the Selected Device | | | | | | | |
| 3 | Device Name ▶ | DNS Name ▶ | Site ID ▶ | Management IP ▶ | Model ▶ | IDS Version ▶ | OOB Number ▶ | Flash |

Fig. 12b

| | A | B | C | D | E |
|---|---|---|---|---|---|
| 1 | | | Calc Site ID | | |
| 2 | Clear Selected Device | | | | |
| 3 | Device Name ▶ | DNS Name ▶ | Site ID ▶ | Management IP ▶ | Management Interface ▶ |
| 4 | | | 0001 | | Loopback0 |
| 5 | | | 0001 | | Loopback0 |
| 47 | | | 0036 | | Loopback0 |

Fig. 12c

| | A | B | C | D | E |
|---|---|---|---|---|---|
| 1 | | | Calc Site ID | | |
| 2 | Clear Selected Device | | | | |
| 3 | Device Name ▶ | DNS Name ▶ | Site ID ▶ | Management IP ▶ | Management Interface ▶ | Status |
| 4 | | | 0001 | | Sort Ascending |
| 5 | | | 0001 | | Sort Descending |
| 6 | | | 0002 | | (All) |
| 7 | | | 0003 | | (Top 10...) |
| 8 | | | 0004 | | (Custom...) |
| 9 | | | 0005 | | Loopback0 |
| | | | | | Loopback1 |
| | | | | | Loopback2 |

|   | A | B | C | D | E | F |
|---|---|---|---|---|---|---|
| 1 |   |   |   |   |   |   |
| 2 | Clear Selected Device |   |   |   |   |   |
| 3 | Device Name ▶ | DNS Name ▶ | Management IP ▶ | Management Interface ▶ | Status ▶ | Model ▶ |
| 4 |   |   |   | Sort Ascending |   | 2811 |
| 5 |   |   |   | Sort Descending |   | 2610XM |
| 6 |   |   |   | (All) |   | 2811 |
| 7 |   |   |   | (Top 10...) |   | 2611XM |
| 8 |   |   |   | (Custom...) |   | 2610XM |
| 9 |   |   |   | Loopback0 |   | 2611XM |
| 10|   |   |   | Loopback1 |   | 2611XM |
|   |   |   |   | Loopback2 |   |   |

Fig. 13

METHOD AND SYSTEM FOR AUTOMATING NETWORK ENGINEERING

BACKGROUND INFORMATION

Managing networks may involve monitoring a large number of network devices, network subnets, routing configurations, addressing schemes and other details. The configuration details associated with multiple devices can be significant and identifying problematic or undesirable device configurations among the configuration details may be difficult. The ability to identify configurations which need to be changed and changing them efficiently also affects the transfer of network management responsibilities and the addition of new network devices.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 8a depicts a user interface for configuring local files of a network engineering automation system, in accordance with an exemplary embodiment.

FIG. 8b depicts a user interface for configuring an external system name to synchronize with a network engineering automation system, in accordance with an exemplary embodiment.

FIG. 8c depicts a user interface for enabling synchronization of an external system with a network engineering automation system, in accordance with an exemplary embodiment.

FIG. 11a depicts a user interface of a component of a network engineering automation system for network device entry, in accordance with an exemplary embodiment.

FIG. 11b depicts a user interface of a component of a network engineering automation system for network device access, in accordance with an exemplary embodiment.

FIG. 12a depicts a device information display of a user interface of a component of a network engineering automation system for network device analysis, in accordance with an exemplary embodiment.

FIG. 12b depicts pre-populated selections of a device information display of a user interface of a component of a network engineering automation system for network device analysis, in accordance with an exemplary embodiment.

FIG. 12c depicts sorting of a user interface of a component of a network engineering automation system for network device analysis, in accordance with an exemplary embodiment.

FIG. 13 depicts a filtering a user interface of a component of a network engineering automation system for network device analysis, in accordance with an exemplary embodiment.

DETAILED DESCRIPTION OF PREFERRED EMBODIMENTS

Figure 1:
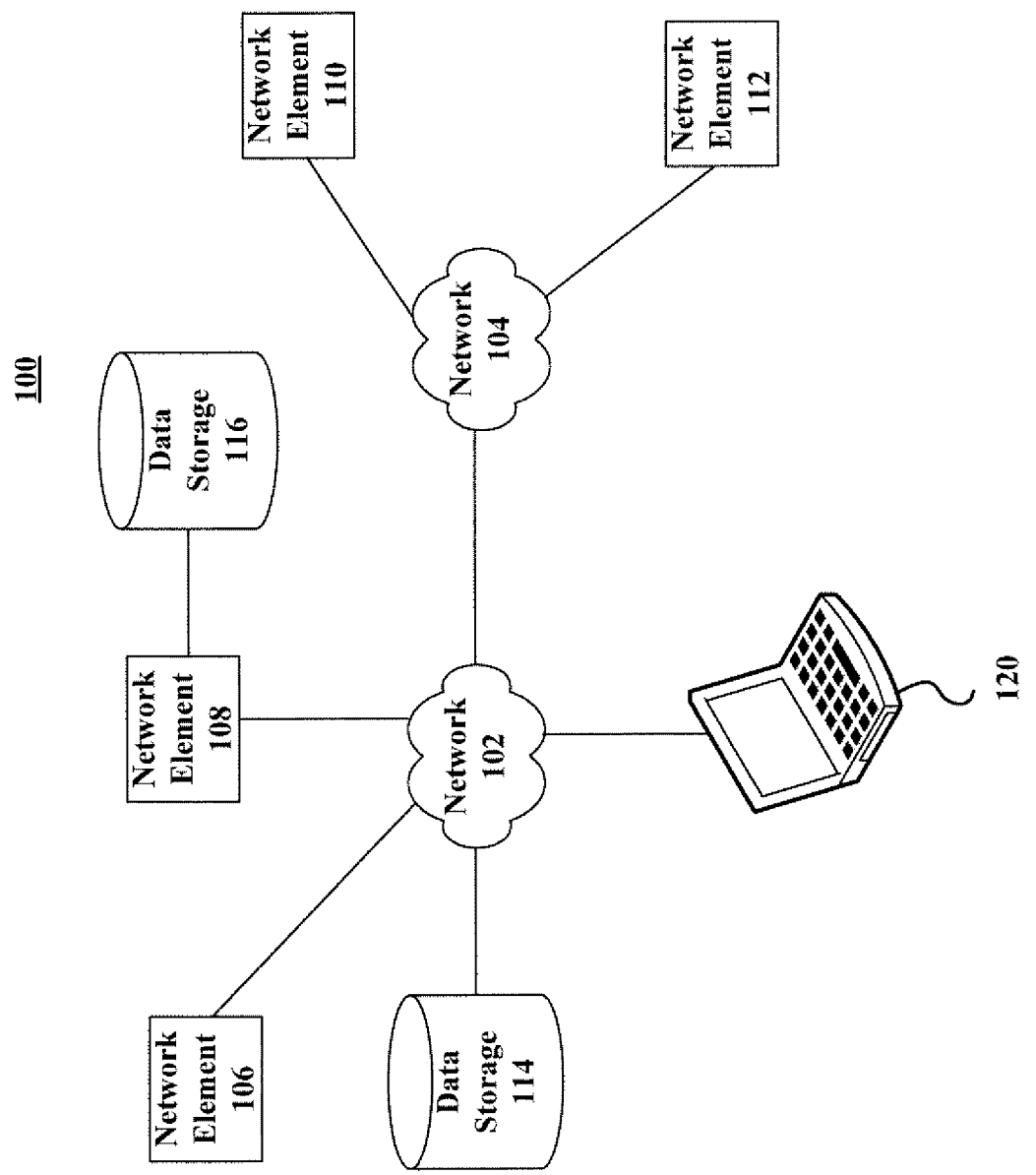
FIG. 1 depicts a network engineering automation system, in accordance with an exemplary embodiment.

An exemplary embodiment provides a network engineering automation system. The network engineering automation system may analyze one or more network devices, identify one or more network devices to be configured and enable configuration of the identified devices. For example, a network engineering automation system may enable a user to obtain one or more network device configurations (e.g., routers, switches), analyze such configurations, identify discrepancies between such configurations and specified settings, generate commands to reconfigure one or more devices to address one or more such discrepancies, and deliver one or more configuration commands to one or more network devices causing the desired reconfiguration of one or more network devices.

According to an exemplary embodiment, the network engineering automation system may provide templated commands and/or other features that may enable a user to perform one or more network engineering actions without requiring the user to specify device and/or technology specific syntax. A command interpreter module of the network engineering automation system may enable a graphical user interface for the user which may parse one or more selections, choices or other data inputted by a user via the graphical user interface into one or more network device executable commands. The graphical user interface may provide a more intuitive interface for the user by eliminating the need for the user to understand network device and/or technology specific syntax, commands and/or programming.

A user interface of the network engineering automation system may provide one or more features enabling a user to navigate, prioritize, filter, sort, and/or identify specified elements of one or more networks without requiring a user to program a query or specify network device executable commands. For example, a user may use a template to specify a target configuration. The network engineering automation system may use values specified in the target configuration to parse one or more portions of device data, such as device configuration files, to identify one or more network elements that do not conform with the specified target configuration. This may enable a user to identify one or more network elements of one or more large networks quickly and efficiently without requiring a user to program network device commands. In another example, the network engineering automation system may display network data in an interface with one or more interface controls, such as dropdowns, menus, and buttons, to enable filtering of network data, sorting of network data, and querying of network data. Additionally, the network engineering automation system may retrieve, parse, and/or display one or more network device configuration values enabling a user to understand a network device setting without understanding device/technology specific communication interfaces and/or device/technology specific configuration data structures.

The network engineering automation system may provide the ability for a network engineer to maintain accurate network device information and view the network device information in an organized manner. This may enable a user to perform network engineering functionality for a network that may consist of hundreds of sites and hundreds of network devices. As needs of the network users, network owners, and/or network operators change the network engineering automation system may enable a network to be modified and/or configured by personnel without requiring the personnel to know device specific syntax and/or programming.

The description below identifies servers, mobile devices, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, mobile devices, and network elements, etc.) separately. The functions described as being performed at various components may be performed at other components, and the various components may be combined and/or separated. Other modifications also may be made.

Referring to FIG. 1, a network engineering automation system, in accordance with an exemplary embodiment is illustrated. It is noted that System 100 is a simplified view of a network and may include additional elements that are not depicted. As illustrated, network elements 106 and 108 may be communicatively coupled to network 102. Network elements 106 and 108 may be communicatively coupled to other devices, such as data storage 114, data storage 116, and the computer 120. Network elements 110 and 112 may be communicatively coupled to network 104.

Network 102 and/or network 104 may be a local area network (LAN), a wide area network (WAN), the Internet, a cellular network, a satellite network, or another network that permits communication between network elements 106, 108, 110, 112, the computer 120 and other devices communicatively coupled to networks 102 and 104. According to one or more embodiments, network 102 may be a service provider's network and network 104 may be a network managed by the service provider, such as a client network. According to some embodiments, networks 102 and 104 may be networks owned and operated by the same entity.

Network elements 106, 108, 110 and 112 may transmit and/or receive data via one or more network paths. The data may be transmitted and/or received utilizing a standard telecommunications protocol or a standard networking protocol. For example, data may be transmitted and/or received using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data. Data may be transmitted and/or received wirelessly or may utilize cabled network connections or telecom connections such as an Ethernet RJ45/Category 5 Ethernet connection, a fiber connection, a traditional phone wireline connection, a cable connection or other wired network connection. Network elements 106, 108, 110 and 112 may use standard wireless protocols including IEEE 802.11a, 802.11b and 802.11g. Network elements 106, 108, 110 and 112 may also be communicatively coupled via protocols for a wired connection, such as an IEEE Ethernet 802.3.

Network paths between network elements 106, 108, 110 and 112 may be network connections utilizing Ethernet, Multi-Protocol Label Switching (MPLS) based Ethernet, Asynchronous Transfer Mode (ATM), Synchronous Optical Networking (SONET), Synchronous Digital Hierarchy (SDM), Plesiochronous Digital Hierarchy (PDH), Digital Subscriber Line (DSL), Asymmetric Digital Subscriber Line (ADSL), Symmetric Digital Subscriber Line (SDSL), Fiber To The Premises (FTTP), cable modem broadband, leased line, Integrated Services Digital Network (ISDN), dial-up, satellite, wireless networking, broadband over power lines and/or other network technologies.

Network elements 106, 108, 110 and 112 may be one or more routers, switches, hubs, and/or other network connectivity devices. Network elements 106, 108, 110 and 112 may include one or more processors (not shown) for recording, transmitting, receiving and/or storing data. Although network elements 106, 108, 110 and 112 are each depicted as single network connectivity devices, it should be appreciated that the contents of network elements 106, 108, 110 and 112 may be combined into fewer or greater numbers of network connectivity devices and may be connected to one or more data storage systems, such as data storage 114 and/or data storage 116. Furthermore, network elements 106, 108, 110 and 112 may be local, remote, or a combination thereof to each other. Network elements 106, 108, 110 and 112 may be different portions of a network such as edge nodes, core nodes, customer premise equipment, a hubbing node, an edge device, and an integrated access device or other network connectivity devices. According to one or more embodiments, one or more network elements, such as network element 106, may be a server. One or more network elements, such as network element 108, may be a network authentication server, such as a Remote Authentication Dial In User Service (RADIUS) Server, a Terminal Access Controller Access-Control System (Tacacs) Server, or other network access server. In one or more embodiments, network elements 110 and 112 may be managed network devices. In one or more embodiments, a network element, such as network element 108, may represent one or more servers at a network operations center.

Network elements 106, 108, 110 and 112 may provide Application Programming Interfaces (APIs), interface tables, Remote Procedure Calls (rpcs), web services, Extensible Markup Language (XML) based interfaces, Simple Object Access Protocol (SOAP) based interfaces, Common Request Broker Architecture (CORBA) and other interfaces for sending or receiving network information.

Data storage 114 and 116 may be network accessible storage and may be local, remote, or a combination thereof to network elements 106, 108, 110 and 112. Data storage 114 and 116 may utilize a redundant array of inexpensive disks (RAID), a redundant array of inexpensive nodes (RAIN), tape, disk, a storage area network (SAN), or other computer accessible storage. In one or more embodiments, Data storage 114 and 116 may be a database, such as an Oracle database, a Microsoft SQL Server database, a DB2 database, a MySQL database, a Sybase database, an object oriented database, a hierarchical database, or other database. According to one or more embodiments, data and/or logic may be stored in a spreadsheet format, such as a XLS format, a CSV format or other spreadsheet formats. Data storage 114 may store network data such as data about one or more network devices, network device connectivity and other network information. Network data may be for one or more networks, such as networks 102 and/or 104. Data storage 116 may store connection, access and/or authentication information such as information used by a network authentication server.

The computer 120 may be a desktop computer, a laptop computer, a server or other computer capable of performing network analysis. The computer 120 may receive data from user input, a network management system, a network provisioning system, a management information base, a network services ordering system, a database, a file, a web service, and/or an application programming interface. The computer 120 may query other systems and/or local or remote storage such as data storage 114 and/or data storage 116 to obtain network device information. In one or more embodiments, the computer 120 may utilize locally stored information.

In one or more embodiments, the computer 120 may provide a user interface to a network engineering automation system. The computer 120 may utilize logic stored locally and/or on a network element, such as network element 106, to perform one or more network engineering functions. The computer 120 may receive or gather information about one or more network devices such as network elements 110 and 112. Network data may be received as an electronic file such as a router configuration file or other network device configuration file. Network data may also be input by a user. The computer 120 may remotely access a network device to query and/or obtain network information from that device. Network data may be stored on storage locally on the computer 120 or on network accessible storage, such as data storage 114. The parsing and/or retrieval of network data device may enable a user to access network device configuration values without requiring a user to parse and/or understand the syntax and/or structure of device configuration data.

In one or more embodiments, the computer 120 may execute logic contained in standalone or self contained spreadsheet. The spreadsheet may be a single user file enabling only one person to update the spreadsheet at a given time. While using the spreadsheet, one or more portions of the processing, communications, and calculations may occur on a user's laptop, such as for example, the computer 120. Network element 106 may be a server which may store the spreadsheet. In other embodiments, the computer 120 may provide an interface to a multi-user system, such as a system which may have a database back end and a web based front end. Logic may be implemented on various servers and/or tiers and may utilize web services, SOAP or other interface methodologies for communication.

According to one or more embodiments, the computer 120 may gather network data about one or more network devices of a secondary network, such as network 104. Authentication, authorization or other measures may be required to access one or more resources of a secondary network. Network element 106 may be a network authentication server which may utilize connection and/or authentication information stored on data storage 116 to manage access one or more resources of network 104. A user of the computer 120 may utilize network element 108 to access network 104.

Network data received by the computer 120 may be parsed, filtered and analyzed to display specified attributes of one or more network devices. The computer 120 may utilize a template such as a spreadsheet or other data structure which may contain logic instructing the computer 120 to parse configuration files and/or other network data. The computer 120 may display attributes of one or more network devices in a predetermined format. The computer 120 may enable, filtering, sorting, charting, graphing and other analysis of network devices, network device connectivity, and other network device attributes. The computer 120 may utilize a spreadsheet that has been enhanced with Visual Basic programs or other executable code which may provide additional capabilities to the spreadsheet. The computer 120 may enable a user to manage a significant amount of network device information from one or more networks by using an intuitive interface which may eliminate the need for the user to understand network device and/or technology specific syntax, commands and/or programming.

The computer 120 may analyze network interfaces and/or connectivity of one or more network devices and may generate information and/or displays depicting network connectivity, network configuration, network addressing schemes and other network configuration information. The computer 120 may enable the management of one or more network addressing schemes including IP network address management, subnetting, Network Address Translation (NAT), private IP configurations, network address assignments, and other network address functionality. The computer 120 may dynamically reserve and assign IP addresses from predefined ranges. IP addresses may be released back into the pools for re-assignment by the computer 120.

A user of the computer 120 may utilize a template to generate a query or request for further network data. The computer 120 may enable a user to specify a configuration for one or more network devices utilizing a template or other data structure to identify settings, ranges and/or values for one or more network device attributes. The computer 120 may enable a user to query and/or sort to display one or more network devices which may either be compliant and/or non-compliant with the specified configuration. A user may thus be able to identify one or more network elements of one or more large networks without programming network device specific commands and/or understanding programming syntax.

A user may utilize the computer 120 and a template, or other data structure containing logic, to configure one or more network devices. For example, a user may set one or more desired attribute settings in a template to configure a router for a desired quality of service. The user may utilize information regarding non-compliant network devices identified by the computer 120 and a configuration template to generate one or more commands to configure the one or more identified non-compliant devices. In one or more embodiments, the commands may be stored as a configuration file and provided to network personnel to upload to the devices. In one or more embodiments, the commands may be transmitted across a network connection, a modem connection, and/or a direct physical connection to automatically configure one or more network devices.

The various components of system 100 as shown in FIG. 1 may be further duplicated, combined and/or integrated to support various applications and platforms. Additional elements may also be implemented in the systems described above to support various applications.

Figure 2:
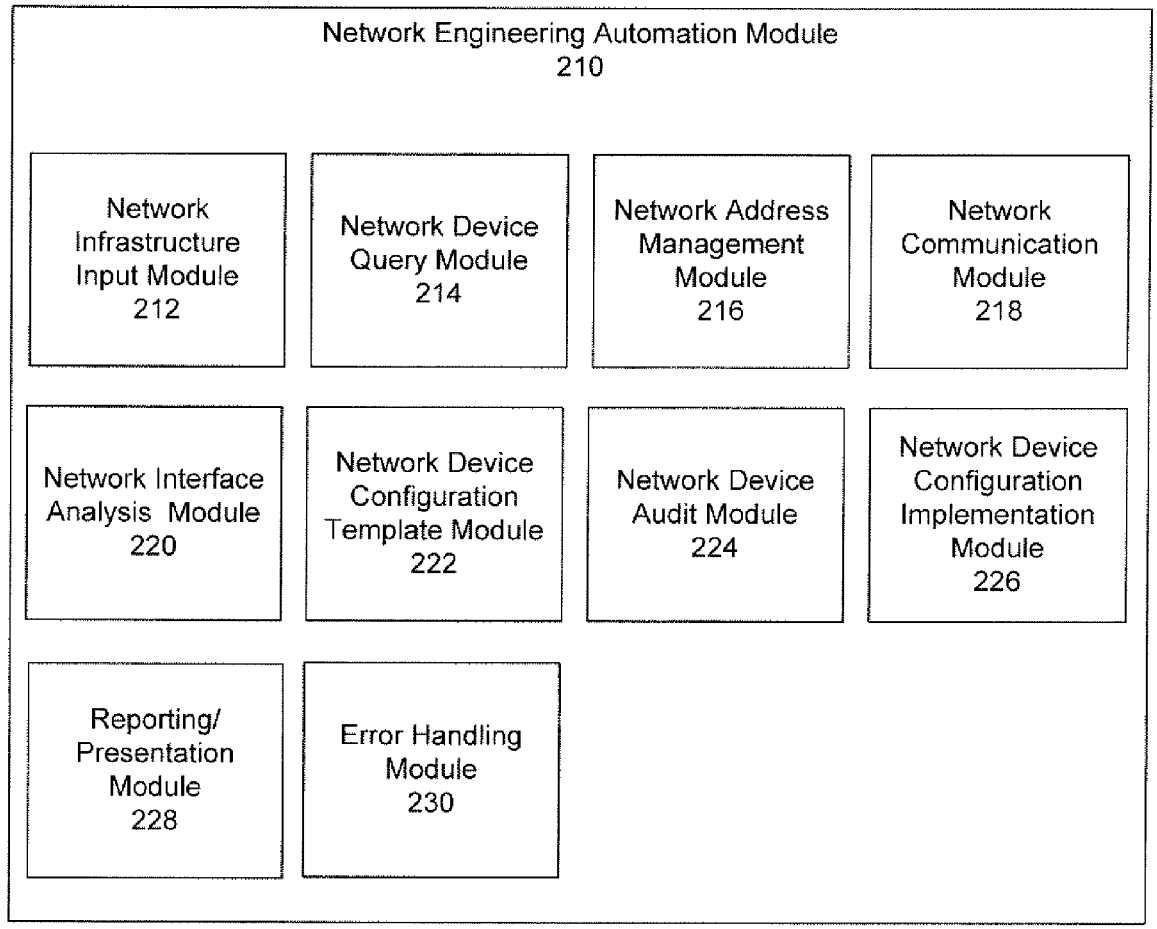
FIG. 2 depicts a module for automating network engineering, in accordance with an exemplary embodiment.

Referring to FIG. 2, a module for automating network engineering is depicted, in accordance with an exemplary embodiment. FIG. 2 illustrates modules of network engineering automation module 210 including: network infrastructure input module 212, network device query module 214, network address management module 216, network communication module 218, network interface analysis module 220, network device configuration template module 222, network device audit module 224, network device configuration implementation module 226, reporting/presentation module 228, and error handling module 230.

Network engineering automation module 210 may utilize one or more of the above components to analyze network data and enable network engineering automation.

Network infrastructure input module 212 may accept user inputs via a user interface, may read data files, and may accept network data via other interfaces. Network infrastructure data may include data associated with network devices, network links and/or other network elements. Network data may be received in the form of configuration files, as inputted data, as query responses and in other data formats. Network infrastructure input module 212 may store inputted data locally or in network accessible storage such as data storage 114. Network data may be received via an interface or input by a user for a device to which network engineering automation module 210 currently has no access. This may enable the analysis and/or configuration of a network device that has not yet been installed and/or a network device on a separate network to which there is no current access (e.g., a client network to be managed which has not yet provided access to a service provider).

Network device query module 214 may enable a user to obtain additional network device attribute information. Network device query module 214 may parse a configuration file stored locally to obtain one or more additional network device attributes. Network device query module 214 may also enable a user to access a network device to query the network device to obtain one or more network device attributes.

Network address management module 216 may utilize identified network device connectivity and/or addressing information to manage network addresses for a network, a subnet, and/or a device. Network address management module 216 may assign one or more network addresses for a network device. Network address management module 216 may enable the reservation of network address ranges for specified devices, groups and/or purposes. For example, network address management module 216 may reserve a specified range of addresses for network management purposes. Network address management module 216 may manage and/or enable Network Address Translation (NAT), private IP addressing, subnetting and other network address management functionality.

Network communication module 218 may enable communication between one or more components of a network engineering automation system and a network device to be managed by the system. Network communication module 218 may implement communications libraries for functionality such as authentication, login, opening or closing channels and/or ports, secure shell (SSH) functionality, communication encryption, credential management, file transfer, telnet, terminal emulation, data tunneling, session management, and other communication utilities. In one or more embodiments, the functionality of network communication module 218 may be provided by a third party product such as SecureCRT® of VanDyke Software, Inc. of Albuquerque, N.Mex. In one or more embodiments, the functionality of network communication module 218 may be functionality coded in a language such as TCL (tool command language) and may utilize TCL/tk (TCL toolkit) and/or Expect (a TCL extension). Network communication module 218 may contain logic to enable configurable timeouts and/or responses to interface prompts. Network communication module 218 may contain logic or interface with other components to enable network authentication and/or verification. Network communication module 218 may handle network communications without requiring a user to understand programming or device executable commands.

Network interface analysis module 220 may enable the analysis of one or more network interfaces of a network device. This may enable the analysis of network configuration of one or more network devices, address utilization of one or more network devices, and the structure of one or more networks. Network interface analysis module 220 may utilize network configuration information to determine adjacency of one or more devices and may provide information to reporting/presentation module 228 for network diagramming and/or charting. By determining address utilization of one or more network devices, network interface analysis module 220 may provide information to network address management module 216.

Network device configuration template module 222 may contain one or more data structures, such as templates, enabling the generation of network device configurations. Network device configuration template module 222 may abstract and/or interpret device configuration file formatting, device configuration command syntax and other network device configuration complexities. Network device configuration template module 222 may thus enable a user to perform one or more network engineering functions without programming or understanding network device or technology syntax. Network device configuration template module 222 may enable configuration of one or more network devices utilizing a high level syntax that may be generic across one or more proprietary device interfaces. Network device configuration template module 222 may enable the generation of one or more network device configuration files.

Network device audit module 224 may enable the evaluation of one or more network device attributes, parameters, and/or settings in comparison to one or more specified parameters. Network device audit module 224 may analyze one or more network devices and may label network devices according to a comparison with specified parameters. According to one or more embodiments, network device audit module 224 enable the identification of one or more network devices that do not match a specified configuration. Network device audit module 224 may provide data associated with one or more non-compliant network devices to network device configuration implementation module 226.

Network device configuration implementation module 226 may enable the creation and/or modification of one or more network device configuration files, commands, or settings. Network device configuration implementation module 226 may utilize a configuration or other data generated from network device configuration template module 222. Network device configuration implementation module 226 may utilize network communication module 218 to access one or more network devices to create device configuration files, modify device configuration files, alter device configuration settings and/or execute device configuration commands. Network communication module 218 may be multi-threaded and may enable the concurrent configuration of multiple devices. Network device configuration implementation module 226 may open multiple streams of communication, multiple channels and/or sessions concurrently and may enable a specified group of devices to be configured concurrently. This may enable, for example, a subnet to be configured during the same time frame to minimize disruption to a group of devices. In one or more embodiments, network device configuration implementation module 226 may implement configurations for multiple devices identified by network device audit module 224.

Network device configuration implementation module 226 may enable the exporting of configuration files, configuration commands, configuration scripts, and/or configuration settings. Network device configuration implementation module 226 may enable a user to provide an exported file, script, utility, settings, and/or commands to an administrator of a network device. This may enable the configuration of a device to which there is currently no network access for network engineering automation module 210. For example, a configuration file may be emailed, uploaded, sent via FTP, or otherwise provided to a user of network engineering automation module 210. Network engineering automation module 210 may not have network access to the one or more devices corresponding to the network configuration file. A user of network engineering automation module 210 may generate an exported file, script, utility, settings, and/or commands and may save them to a file. The file may then be put on recordable media and sent to an administrator with access to the appropriate network devices, may be emailed to an administrator, sent via FTP to an administrator or otherwise provided to an administrator. Network device configuration implementation module 226 may enable the ftping, emailing, printing, and/or other communication of settings configuration files, scripts, utilities, and/or device configuration commands.

Reporting/presentation module 228 may produce one or more reports containing network information. Reports may be printed, web based, sent in a text message or email, or stored as a file. Formatting options may enable the generation of one or more device configuration files, network diagrams, network address assignment tables, device configuration tables, or other network and/or device information.

Error handling module 230 may handle one or more errors encountered when performing network engineering and/or analysis. For example, error handling module 230 may handle errors related to data input format, device configuration errors, device analysis errors, reporting errors, or other errors.

In some embodiments, one or more modules of network engineering automation module 210 may enable command abstraction and/or interpretation. Command abstraction and/or interpretation may provide a high level, easier to understand interface to one or more proprietary command based network device interfaces. Command abstraction may enable a network engineer to provide the same command to achieve the same effect and/or information across different proprietary interfaces for devices manufactured by different vendors. Command abstraction may hide lower level complexities of connecting to devices, managing sessions with devices, parsing device configuration files, and/or managing devices.

Figure 3:
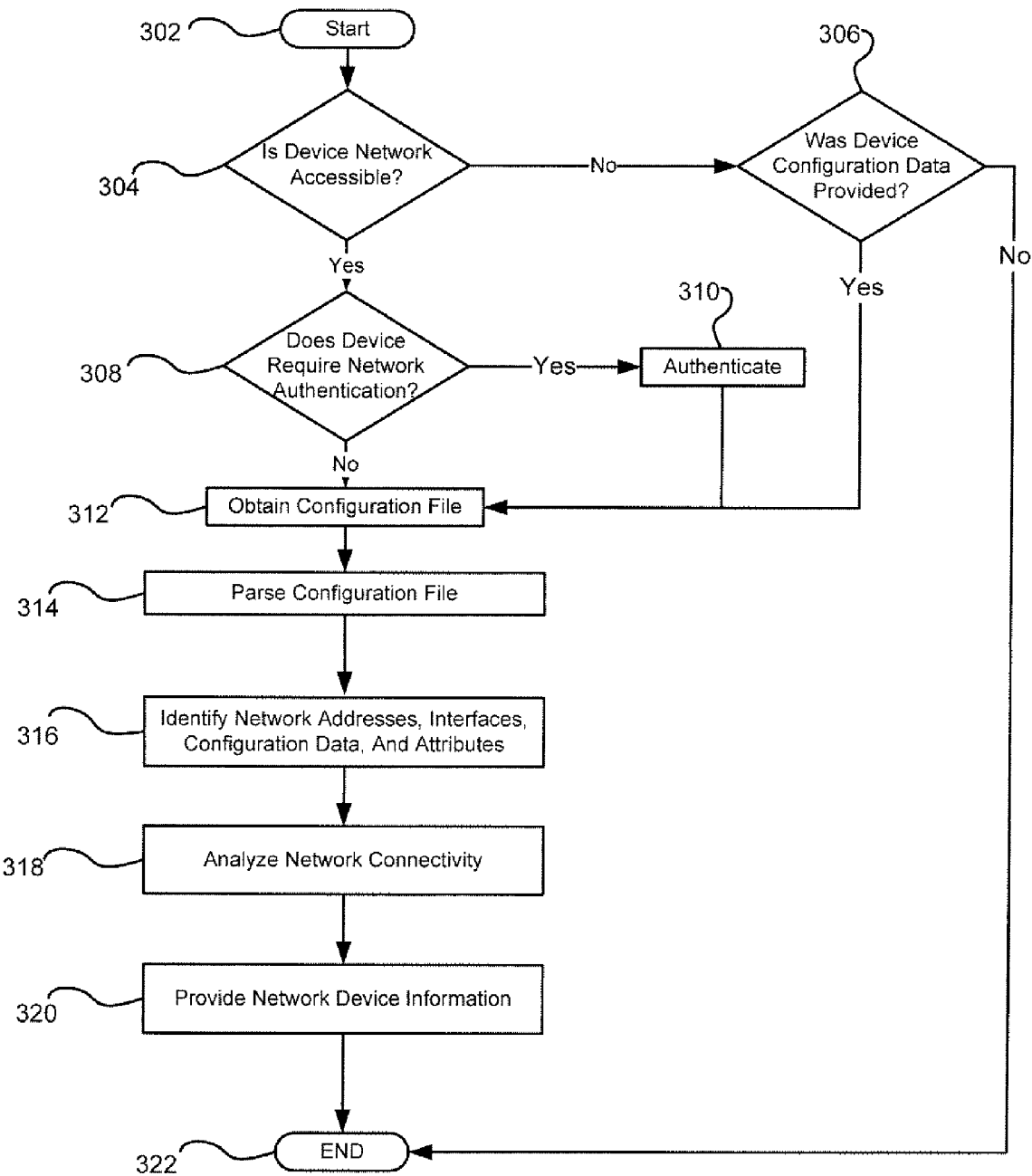
FIG. 3 depicts a method for obtaining and displaying network device configuration information, in accordance with an exemplary embodiment.

FIG. 3 illustrates a flow diagram of a method 300 for obtaining and displaying network device configuration information, in accordance with an exemplary embodiment. This exemplary method 300 is provided by way of example, as there are a variety of ways to carry out the method. The method 300 shown in FIG. 3 can be executed or otherwise performed by one or a combination of various systems. The method 300 is described below may be carried out by the network engineering automation system 100 shown in FIG. 1 and network engineering automation module 210 shown in FIG. 2 by way of example, and various elements of the FIGS. 1 and 2 are referenced in explaining exemplary method 300 of FIG. 3. Each block shown in FIG. 3 represents one or more processes, methods or subroutines carried out in exemplary method 300. Referring to FIG. 3, exemplary method 300 may begin at block 302.

Block 304 may determine if a device is network accessible. If network connection information has been provided or is available, block 304 may determine that a device is network accessible. For example, the computer 120 may determine by the presence of network connection information that network element 110 is remotely accessible. In one or more embodiments, block 304 may prompt a user, or attempt a network connectivity test. If the device is network accessible the method 300 may continue at block 308. If the device is not network accessible the method 300 may continue at block 306.

Block 306 may determine if device configuration data was provided or is available. Device configuration data may be inputted, uploaded, or otherwise received. For example, an owner of one or more network devices may send device configuration data, such as router or switch configuration files to a network engineering automation personnel. The network engineering automation personnel may upload the files to a system, such as the computer 120 and/or network element 106 of system 100. If device configuration data was provided the method 300 may continue at block 312. If device configuration data was not provided the method 300 may end at block 322.

At block 308, the method 300 may determine whether the device utilizes network authentication, login, credentials, encryption, a shared secret or other security mechanisms to manage access. For example, configuration data associated with a device may indicate whether one or more authentication mechanisms is utilized. If access is managed the method 300 may continue at block 310. If access is not managed the method 300 may continue at block 312.

At block 310, the method 300 may authenticate, provide credentials, utilize a public and/or private key, utilize a shared secret, or utilize other security mechanisms to gain access to a network device. In one or more embodiments, the method 300 may utilize a Remote Authentication Dial In User Service (RADIUS) Server, a Terminal Access Controller Access Control System (Tacacs) Server, or other network access server to authenticate in order to gain access to a network device.

At block 312, the method 300 may obtain a configuration file and/or other device information. In one or more embodiments, the method 300 may utilize the SecureCRT® communication package or another communication package to enable a component, such as a spreadsheet to directly login to one or more devices. Devices may be managed devices which may be listed in a separate customer information system. The method 300 may obtain execute show run and show version commands or other device commands to obtain current configuration data.

At block 314, the method 300 may parse the configuration file. The method 300 may be capable of parsing multiple formats and data structures to extract device configuration information and device attributes. The method 300 may use regular expression matching and logic to extract keywords and associated values from device information data. Device information data and/or configuration files may contain a plurality of attributes. The method 300 may use a template or specified settings to determine which values, settings, and/or attributes to extract. The template and/or specified settings may be configurable and may enable a user to specify desired device attributes to extract. This may enable analysis of one or more network devices to focus on priority settings and/or attributes first and then subsequently to parse a secondary set of attributes, settings, and/or values. Parsed values may include, but are not limited to, IOS version, flash, memory, one or more interfaces, Primary IP addresses, Secondary IP addresses, NATs, and/or ACLs (Access Control Lists).

At block 316, the method 300 may identify network addresses, interfaces, configuration data, and/or attributes of the network device. The identified data may be stored in one or more different data structures such as a database, a flat file, a spreadsheet or other formats. The identified data may also be stored in memory.

At block 318, the method 300 may analyze network connectivity of the device. The configuration of network addresses, network interfaces, and network settings may be utilized to determine network connectivity. By identifying network addresses and/or other network parameters associated with one or more network devices, network connectivity may be determined. In some embodiments, one or more commands may be issued to further test, analyze, and/or identify network connectivity.

At block 320, the method 300 may provide network device information. Network device information may be provided via a user interface such as a display, a printout, a chart, and/or a report. Network device information may also be provided via an Application Programming Interface (API). According to one or more embodiments, network device information may utilize a spreadsheet interface enabling the display of tabular data organized across row, columns and sheets. The spreadsheet interface may enable sorting, filtering, macros, queries, charting, graphing, reporting and other functionality.

In one or more embodiments, the spreadsheet interface may utilize a command abstraction and/or interpretation module which may provide a high level, easier to understand interface to one or more proprietary command based network device interfaces. The command abstraction module may enable a network engineer to provide the same command to achieve the same effect and/or information across different proprietary interfaces for devices manufactured by different vendors. The command abstraction module may hide lower level complexities of connecting to devices, managing sessions with devices, parsing device configuration files, and managing devices. The command abstraction module may utilize template commands with variables to be substituted for device values. By selecting a device in a user interface and a templated command, a user may be able to automatically generate a command for the specified device without knowing the specific device syntax and/or device configuration details.

At block 322, the method 300 may end.

Figure 4:
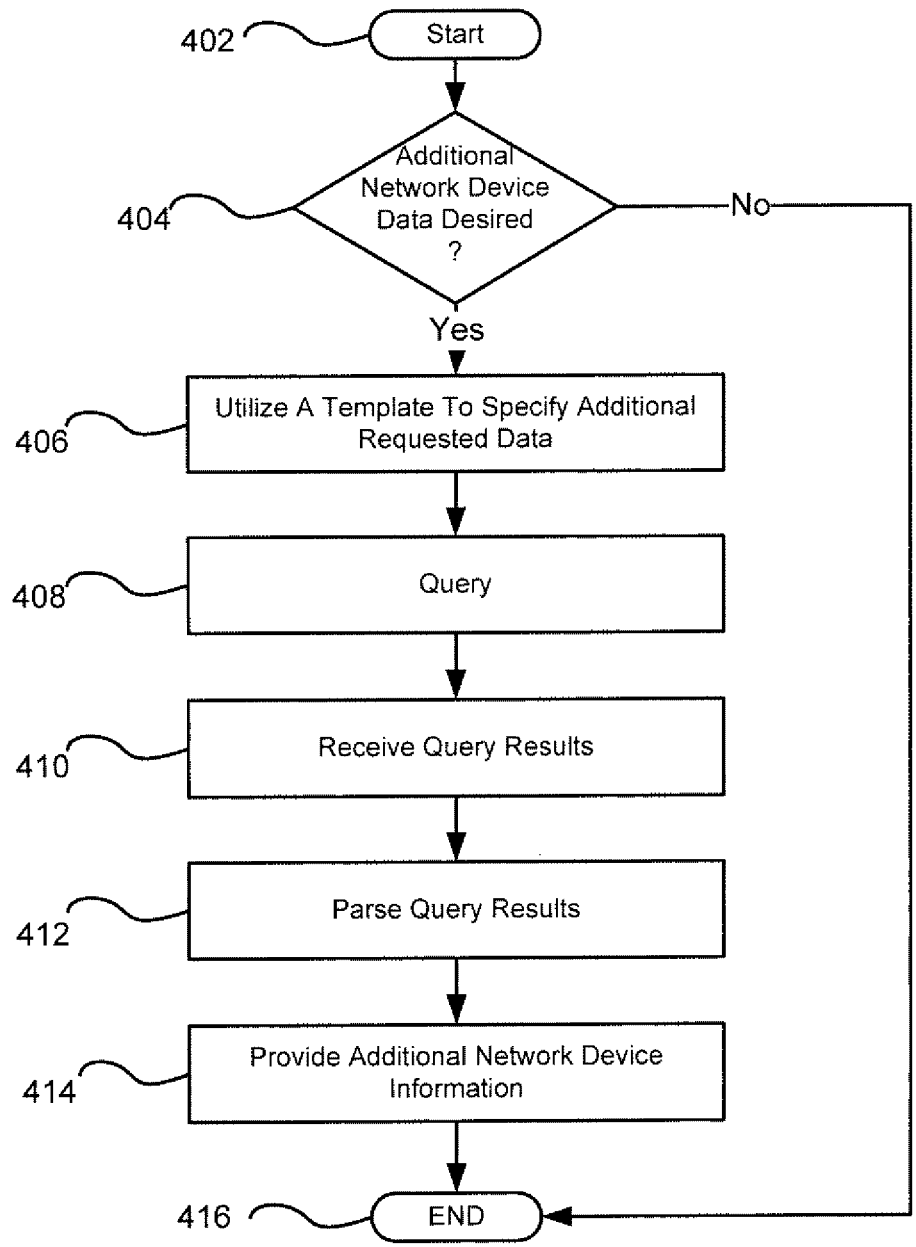
FIG. 4 depicts a method for identifying additional network device information, in accordance with an exemplary embodiment.

FIG. 4 illustrates a flow diagram of a method 400 for identifying additional network device information, in accordance with an exemplary embodiment. This exemplary method 400 is provided by way of example, as there are a variety of ways to carry out the method. The method 400 shown in FIG. 4 can be executed or otherwise performed by one or a combination of various systems. The method 400 is described below may be carried out by the network engineering automation system 100 shown in FIG. 1 and network engineering automation module 210 shown in FIG. 2 by way of example, and various elements of the FIGS. 1 and 2 are referenced in explaining exemplary method 400 of FIG. 4. Each block shown in FIG. 4 represents one or more processes, methods or subroutines carried out in exemplary method 400. Referring to FIG. 4, exemplary method 400 may begin at block 402.

At block 404, the method 400 may determine whether additional network device data is desired. According to one or more embodiments, an initial display of device information may be obtained by method 300. Such device information may be a predetermined and/or higher level view of device settings. A user may determine that additional configuration data, settings, and/or values of a device need to be analyzed. In some embodiments, the request for additional network device data may function as an audit and may identify one or more devices according to their values for one or more specified settings. For example, a user may request the identify of one or more devices on the network that have a particular setting value, such as routers or switches configured for a particular setting value for quality of service, or a specified setting for a network gateway address. The identified devices may be those devices which do conform to a specified setting or those devices that do not fall within a specified setting. The specified setting may be a range or a list of values. If additional device data is desired the method 400 may continue at block 406. If no further device information is desired the method 400 may end at block 416.

At block 406, the method 400 may utilize a template or other specified settings to identify additional requested data. For example, the method 400 may utilize other specified settings as search criteria to identify configuration values when parsing configuration data.

At block 408, the method 400 may query to obtain additional configuration data. The query may be parsing of a previously obtained configuration file and/or configuration data to extract additional results. The query may be executing commands against a network device, requesting additional data, and/or downloading additional data. For example, the computer 120 may execute on or more commands on network element 110 and/or network element 112 to receive additional network device configuration information.

At block 410, the method 400 may receive query results. The results may be received as a response to a command issued in a session, uploaded as data, inputted via a user interface, or received via an Application Programming Interface (API). For example, the results may be the response to a command such as sho ip route, or an extended ping command.

At block 412, the method 400 may parse the query results. Network device data may be extracted, filtered, sorted, and/or formatted. Extraction may involve the use of pattern matching and/or regular expressions to identify one or more device configuration values. Parsed data may be additional network device information and may be stored locally or on network accessible storage.

At block 414, the method 400 may provide the additional network device information obtained from the parsed data. Network device information may be provided via a user interface such as a display, a printout, a chart, and/or a report. Network device information may also be provided via an Application Programming Interface (API).

At block 416, the method 400 may end.

Figure 5:
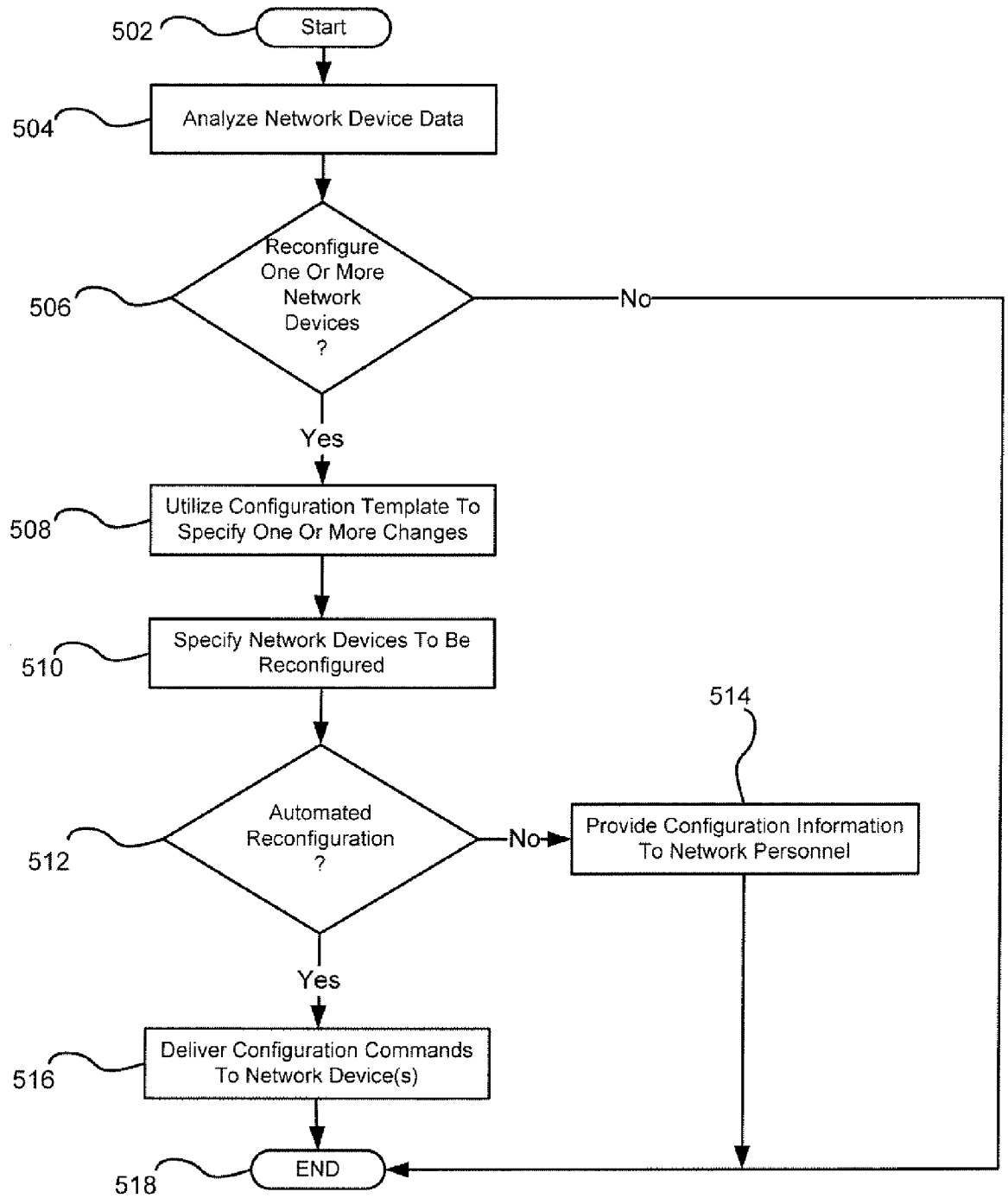
FIG. 5 depicts a method for configuring one or more network devices, in accordance with an exemplary embodiment.

FIG. 5 illustrates a flow diagram of a method 500 for configuring one or more network devices, in accordance with an exemplary embodiment. This exemplary method 500 is provided by way of example, as there are a variety of ways to carry out the method. The method 500 shown in FIG. 5 can be executed or otherwise performed by one or a combination of various systems. The method 500 is described below may be carried out by the network engineering automation system 100 shown in FIG. 1 and network engineering automation module 210 shown in FIG. 2 by way of example, and various elements of the FIGS. 1 and 2 are referenced in explaining exemplary method 500 of FIG. 5. Each block shown in FIG. 5 represents one or more processes, methods or subroutines carried out in exemplary method 500. Referring to FIG. 5, exemplary method 500 may begin at block 502.

At block 504, the method 500 may analyze network device data. In one or more embodiments, method 500 may compare network device data with one or more predetermined settings. In some embodiments, method 500 may present network device data to a user for analysis. For example, the computer 120 may provide a user interface displaying network device data.

At block 506, the method 500 may utilize analyzed network device data to determine if configuration of one or more network devices is desirable. If configuration of one or more network devices is desirable, the method 500 may continue at block 508. If configuration of one or more network devices is not desired, the method 500 may end at block 518.

At block 508, the method 500 may utilize a configuration template or other configuration utility to specify one or more configuration changes. The configuration template may contain commands and/or scripts with variables that may be substituted for device specific values.

At block 510, a user may view information associated with one or more analyzed devices and may specify one or more network devices to be reconfigured. In some embodiments, one or more devices identified in method 400 may be utilized as the identified devices. For example, method 400 may perform an audit of network devices to identify devices which do not comply with one or more specified settings. The identified one or more non-compliant network devices may be displayed to a user and the user may identify one or more the devices to be reconfigured. In some embodiments, generation of configuration commands for devices identified in method 400 may occur automatically or may only require user confirmation. In one or more embodiments, one portion of a user interface, such as a window or a sheet of a spreadsheet, may list identified devices, a second portion of a user interface, such as a second window or second sheet of a spreadsheet, may contain templated configuration commands. Templates may contain a combination of standard commands and user defined variables. Variables may be evaluated for one or more devices and the resulting configuration commands may displayed for review and/or delivery to a user or a device. Complex templates may be prepared to handle design variations such as different backup network connections (e.g., ISDN vs VPN) or other structural variations. A user may utilize a command, a menu selection, an input, a macro or other user interface control to cause the method 500 to automatically substitute the values of one or more devices for variables in the templated configuration commands. The method 500 may enable the duplication of the templated configuration commands so that a copy may be generated for each device with device specific values substituted for variables in the templated configuration commands. For example, device specific network names, network addresses, logins, passwords or other configuration details may be automatically substituted into a templated configuration command to generate device specific configuration commands or files.

At block 512, the method 500 may determine whether automated reconfiguration is possible and/or desirable. For example, the method 500 may determine whether a device is network accessible, whether the configuration may cause a service disruption, and/or whether the device has a scheduled maintenance window. If the configuration is to be automated the method 500 may continue at block 516. If the configuration is not to be automated the method 500 may continue at block 514.

At block 514, the method 500 may provide network device configuration information to network personnel. For example, the method 500 may utilize ftping, emailing, printing, a user interface and/or other communication of settings, configuration files, scripts, utilities, and/or device configuration commands.

At block 516, the method 500 may deliver network configuration information, commands, and/or scripts to one or more network devices. According to one or more embodiments, the method 500 may utilize the SecureCRT package to deliver network configuration information. Other communication packages or communication code such as Expect based modules may be utilized.

At block 518, the method 500 may end.

Figure 6:
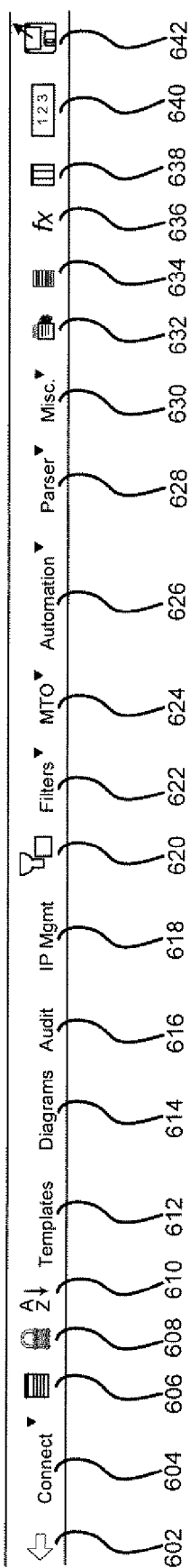
FIG. 6 depicts a user interface for a network engineering automation system, in accordance with an exemplary embodiment.
Figure 7:
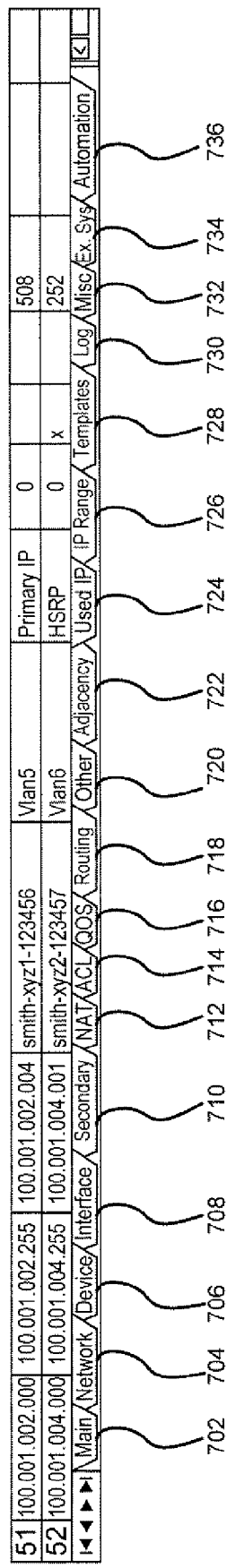
FIG. 7 depicts a user interface of a component of a network engineering automation system for network addressing analysis, in accordance with an exemplary embodiment.

Referring to FIG. 6, a user interface for a network engineering automation system, in accordance with an exemplary embodiment is illustrated. One or more buttons, pull-downs, menus, or other user interface controls may be contained on a menu bar or other portion of a user interface. As illustrated, find button 602 may finds a device based on text input by a user. For example, a user may find a device by entering an IP address or part of the hostname in a text box which may be provided after clicking on find button 602. Connect button 604 may launch a connection interface dialog, such as the SecureCRT application and may automatically connect to a selected device. Show config button 606 may display the configuration file associated with a selected device. Passwords button 608 may allow you to enter your personal passwords. Password information may be stored on your local C drive in an encrypted form or may be stored on a secure network device in an encrypted form. Sort button 610 may sorts the current sheet in ascending order based on the current column. Templates button 612 may display a form that may assist the user in creating/maintaining configuration and audit templates. Highlight button 632 may color code the templates to visually enhance their various components. Diagrams button 614 may provide a network diagram based upon parsed network information. Audit button 616 may allow you to perform simple or complex audits and/or extract values from files based on user-defined patterns. IP Management button 618 may allow the management of IP ranges. Available IPs may be found, reserved and re-released back into pools. UnFilter button 620 may remove a filter from the current sheet and displays one or more rows. Filters button 622 may contain several options related to creating/saving and/or loading of filters. MTO button 624 may contain several functions that routinely occur during an MTO (Management Take-Over) project. Automation button 626 may contain several options related to automation (e.g., refresh the network, prepare to push configurations to devices). Parser button 628 may parse the configuration files (e.g., show run/show ver). Miscellaneous button 630 may provides several tools and spreadsheet maintenance functionality. IP Calculator button 634 may display an IP calculator. Calculate button 636 may calculates the current column based on the user defined function. Show/Hide button 638 may allow hiding or showing columns. Count button 640 may count the number of visible rows in the current sheet. Export button 642 may allow the visible rows/columns to be exported to a new sheet Referring to FIG. 7, a user interface of a component of a network engineering automation system for network addressing analysis, in accordance with an exemplary embodiment is illustrated. As illustrated, an exemplary interface of a network engineering automation system may use a spreadsheet interface. Each sheet may be used for a different purpose. Main sheet 702 may be used for data entry and displaying the configuration templates. Network sheet 704 may be used for storing the network wide information such as a customer id or other information. Device sheet 706, interface sheet 708, secondary sheet 710, NAT sheet 712, ACL sheet 714, QOS sheet 716, Routing sheet 718, and Other sheet 720 may be used for storing device configuration information that may be obtained from the configuration files. One or more portions of these sheets may be auto-populated through the parsing of the device configuration files. Adjacency sheet 722 may be calculated at least in part from the data stored in the interface sheet 708 and the secondary sheet 710, such as network address data. Each row of adjacency sheet 722 may contain information about a single connection (adjacency) between two devices via their respective interfaces. Used IP sheet 724 may contain one or more of the known (used) IPs and their subnet masks. This information may be collected from interface sheet 708, secondary sheet 710 and NAT sheet 712. Used IP sheet 724 may be a primary source of information for IP Address Management functionality of the spreadsheet. IP Range sheet 726 may contain user defined ranges/IP pools such as Management Range, Customer LAN ranges, etc. Templates sheet 728 may be used to define configuration templates. Configuration templates may be used for preparing configuration commands that may be delivered to the end devices. Log sheet 730 may be used to store informational messages when a calculation/function is performed on a set of data. Misc sheet 732 may be used for temporary storage and/or calculation of data. It may also used for manually transferring external data in and out of the spreadsheet. External system sheet 734 may be used to synchronize the contents of the spreadsheet with an external customer management system. Automation sheet 736 may be used for delivering updates to a plurality of devices on one or more networks.

A network engineering automation system in accordance with an exemplary embodiment may be very efficient. For example, recalculations (for an entire network) may be completed in seconds. Delivery of up to 700 configurations may occur in approximately 45 minutes. For example, the computer 120 may utilize SecureCRT software to perform multiple concurrent connections. Auditing of an entire network may occur in minutes. The modular design of the network engineering automation system may separate groups of related functionality onto separate user interfaces such as windows, sheets, and/or portlets, and may enable flexible approaches to network engineering. Network engineering automation system may assist engineers in maintaining information about their network(s) and assisting in the many functions that may be routinely performed on those networks. The network engineering automation system may follow many standards to enable the various inter-related functions to operate properly. These standards may be followed while customizing the network engineering automation system to the needs of a specific network.

Referring to FIG. 8*a*, a user interface for configuring local files of a network engineering automation system, in accordance with an exemplary embodiment is illustrated. According to one embodiment, the network engineering automation system interface may be accessible to one or more users by downloading an executable application program such as a spreadsheet and configuring it. In other embodiments, a web based client or other thin client may be utilized to access a server hosting one or more portions of a network engineering automation system.

In one or more embodiments, utilizing a spreadsheet interface, the spreadsheet interface may be configured by the following steps. After opening the spreadsheet, click on the Network sheet tab. Inside the Network sheet, near the top (e.g., rows 5 and 6 of FIG. 8*a*), the Config Directory may be changed to point to a location where the config files may be stored. Referring to FIG. 8*b*, a user interface for configuring an external system name to synchronize with a network engineering automation system, in accordance with an exemplary embodiment is illustrated. On or about row 88 (see FIG. 8*b*), the Ex. System name and the domain information for the network may be changed. This may enable the spreadsheet client to synchronize with an external system containing customer information. Referring to FIG. 8*c*, a user interface for enabling synchronization of an external system with a network engineering automation system, in accordance with an exemplary embodiment is illustrated. Synchronization may be enabled by clicking on the Templates TAB and then clicking on the large button Fix Enable Passwords (row 1 of FIG. 8*c*).

Figure 9:
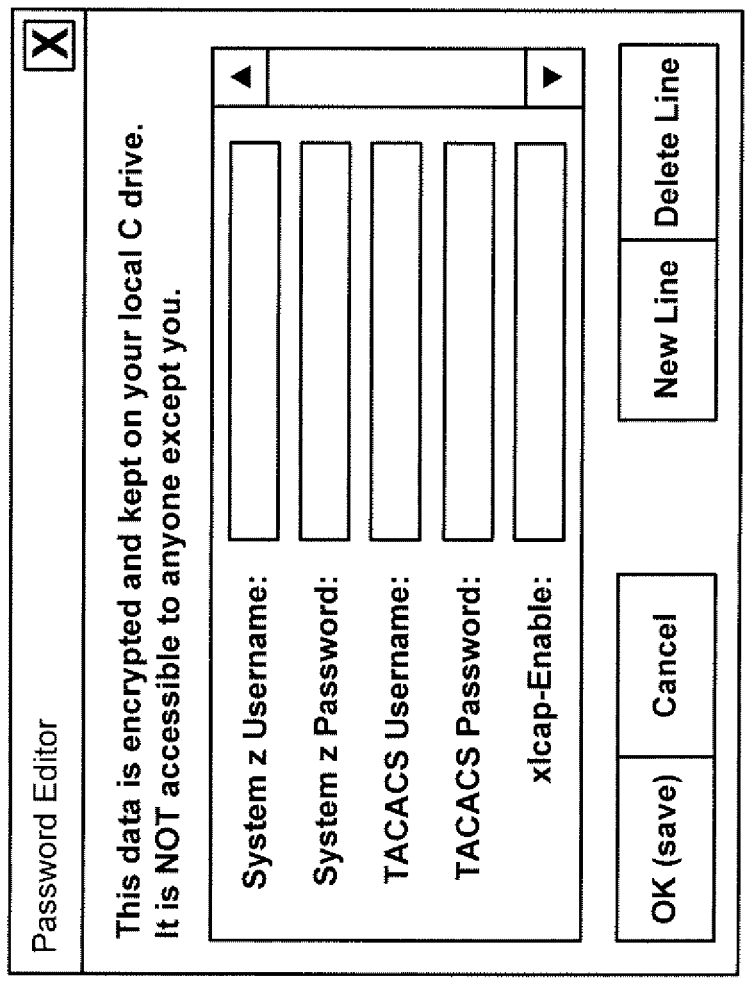
FIG. 9 depicts a screenshot of a user interface of a component of a network engineering automation system for accessing one or more remote network devices, in accordance with an exemplary embodiment.

Referring to FIG. 9, a screenshot of a user interface of a component of a network engineering automation system for accessing one or more remote network devices, in accordance with an exemplary embodiment is illustrated. The user interface may accept information utilized to interact with one or more access management systems prior to gaining access to one or more network devices. According to one or more embodiments, a network engineering automation system may utilize one or more third party tools for communication with network devices. For example, SecureCRT may be utilized. SecureCRT may be configured prior to using a network engineering automation system to access one or more network devices. In other embodiments containing network communication modules for accessing remote network devices similar configuration may be performed. Network communication modules may be configured to access network authentication systems, verification systems, and/or password management systems. It may be necessary to provide a network engineering automation system with one or more passwords, network names, and/or network addresses. These passwords may be stored on a local drive in encrypted form. As such, they may not accessible to anyone except the local user. For example, to setup remote authentication system Z and TACACS passwords click on each password item and enter the proper username/password in the box at the bottom of the form.

Figure 10:
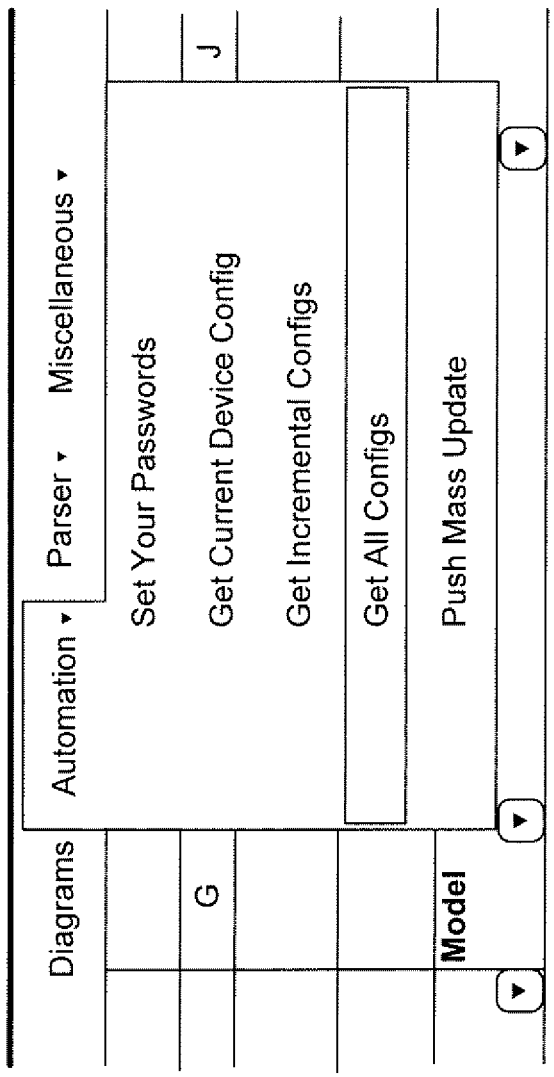
FIG. 10 depicts a partial screenshot of a user interface of a component of a network engineering automation system for automated network device analysis and configuration, in accordance with an exemplary embodiment.

Referring to FIG. 10, a partial screenshot of a user interface of a component of a network engineering automation system for automated network device analysis and configuration, in accordance with an exemplary embodiment is illustrated. According to one embodiment, the interface may be refreshed and/or populated with network device information by clicking on the Device Sheet tab 706 and choosing "get all configs". This may login to one or more authentication servers, Network Operating Center (NOC) systems, and/or password management systems with a specified username/password. It may then issue a command or query retrieving a list of devices from a customer management system. It may then login to each device and issue a Show Run/Show Version command and parse the downloaded configuration files. Depending on the size of the network, this process may take between 2 minutes for a network of 50 sites to 20 minutes for a network of 750 sites. For an incremental update of changes since the last interface refresh "get incremental configs" may be chosen.

Referring to FIGS. 11*a* and 11*b*, a user interface of a component of a network engineering automation system for network device entry, in accordance with an exemplary embodiment is illustrated. As illustrated in FIG. 11a, one or more fields for network addresses, connection information and user id may be provided. A connection method may also be provided. A device may then be selected by clicking on the down arrow button in the Device Name cell (row 1, column B of FIG. 11a.). A template for the selected device may then be chosen by clicking on the down arrow button on Row 12, column A of FIG. 11a. This may display the contents of the selected template (FIG. 11b, rows 4-9). Click on the "Deliver This Template" button (FIG. 11b, row 1, column 5). This may send the contents of the template (as displayed in FIG. 11b) to the selected device.

Referring to FIGS. 12a, 12b, and 12c, a user interface of a component of a network engineering automation system for network device analysis, in accordance with an exemplary embodiment is illustrated. The device sheet may contain one or more devices that comprise the network. This sheet may contain a list of managed devices (i.e. devices managed by a network engineering automation system). Unmanaged devices may be added to this sheet manually if so desired. The device sheet may contain rows and columns. Columns may be a set of information that may be parsed or calculated for each device. Some of the columns are shown in FIG. 12a. Each row below the column headers may be data for a specific device (not shown). Additional columns may be added to this sheet to maintain additional device information. For example, some networks may categorize their devices by a region. In that case, a column may be added to the device sheet to maintain the region information for each device. Column headers may be entered on row #3 of each sheet. The column headers in the device sheet may have a special significance as explained below. When using templates, the column headers in the device sheet may be used as variables names to customize the template for a specific device. Column headers in the device sheet may indicate whether or not a column is used for data entry. If a column header is bolded, then it may be displayed in the Main sheet for data entry (the Main sheet is explained in the following sections). Several buttons may be displayed in the device sheet. The "clear the selected device" button may clear one or more portions of the data for the selected device and deletes the device from the device sheet. The "Calculate Site ID" Button may calculates a numeric Site ID for one or more devices. Devices that are logically adjacent to one another via a series of LAN interfaces may be considered to be in the same site. The "calculate adjacency info" button may create a list of devices that are directly attached to the currently selected device. The interface sheet may contain a list of one or more network interfaces for one or more devices. Interfaces may be parsed and listed in the Interface sheet regardless of shutdown status, and/or type (e.g., physical or logical (tunnels, sub interfaces, etc.)). Each row of this sheet may contain the device name, the interface name, the primary IP address and several other parameters defining the interface. This sheet may automatically be populated using one or more portions of data obtained from the parsing of configuration files.

The Automation Spreadsheet may also filter the contents of various sheets. In the Automation Spreadsheet, filtering may be enabled on one or more sheets. For example, as illustrated in FIG. 12a, in the device sheet, a small dropdown icon appears next to each column header. This is an indication that filtering is enabled for that column.

Referring to FIG. 12b, pre-populated selections are illustrated. Clicking on a dropdown may display one or more distinct values under that column. In this case the column 'Management Interface' contains one of three possible values: Loopback0, Loopback1, and Loopback2. By selecting one of the values, a filter may be activated to only display those rows with the selected value. Referring to FIG. 12c, sorting based on a column value is illustrated.

Referring to FIG. 13, filtering of a user interface of a component of a network engineering automation system for network device analysis, in accordance with an exemplary embodiment is illustrated. The Automation spreadsheet provides several additional filtering functions to allow filters from one sheet to be applied to another sheet. The following example shows the device sheet when filtering is enabled. Note that one or more of the column headers (e.g. Device Name, DNS Name, Management IP, etc.) may have a drop-down (down arrow) icon next to them. In FIG. 13, an expanded view of the drop-down for the Management Interface column has been illustrated. Within the dropdown you can see one or more of the values under the current field.

An exemplary embodiment of a network engineering automation system may utilize sample scripts, model scripts, default values, and/or templates. Templates may be device configuration commands that may contain variables and/or directives. Variables may be named objects that may be evaluated for each device and may be replaced with the resulting value. This may allow a template to be customized for each device. Variables may be enclosed in curly-brackets "{ }". For example {Management IP} may be a variable that is evaluated for each device resulting in a different IP address.

Directives may be instructions to the computer on how to deliver the configuration commands to the router, and how to react to router responses. Directives may be enclosed in square brackets "[ ]". For example [timeout=60] instructs the delivery engine to wait for 60 seconds for the proper response from the router before deciding that the router responded incorrectly to a command. Template types include: Configuration Templates, Script Templates, and Audit Templates.

Configuration Templates may be partial configuration commands (configlets) for a router, a switch, or other network device. The word Template implies that the configlet includes variables that can assume different values for different devices. For example, a template may refer to the variable {loopback0-address}, and this variable may have a different value for each router and/or device. This is the most basic form of a template, i.e. configuration commands containing variables instead of the actual values. Following is an example of a template:

```
interface {LAN Interface Name}
  ip address {LAN Secondary IP} {LAN Secondary Mask} secondary
  ip address {LAN Primary IP} {LAN Primary Mask}
  ip access-group 105 in
  ip helper-address {IP Helper Address}
  no ip proxy-arp
  half-duplex
```

When a configuration template is selected for a specific device, one or more variables may be evaluated for that device and the resulting configuration commands, scripts and/or directives, which may contain the actual values instead of the variable names, may be displayed. Certain variable names, which may appear highlighted in the user interface, may be matched against the column names in the device sheet. When a matching column name is found, the value under that column and for the specific device may be placed into the template replacing the highlighted variable name.

Script templates may be intended for delivery to an end device. As such, scripts and/or commands of a script template may contain additional instructions (called directives) that relate to the command delivery process. For example, a script may define the expected response after a command is delivered to a device, or it may define the acceptable timeout period to wait for the device to respond to a command. Following is an example of a script:

```
[logfile=c:\secure_crt\{Device Name}.completion_notice]
[default_timeout=30]
[ssh=external system 1]
[caption={Device Name}]
d1[prompt=password:][prompt=pdcd01-snmcpe1:~>]
[jump=device_connect]
{external system 1 Password}[prompt=pdcd01-snmcpe1:~>]
[label=device_connect]
telnet {Management IP}[timeout=30][prompt=TACACS Username:]
{external system 1 Username}[prompt=TACACS Password:]
{external system 1
Password}[prompt={Hostname}][defaut_prompt={Hostname}]
en[prompt=Password]
{Enable Password}[prompt={Hostname}#][jump=get_configs]
{Previous Enable}[prompt={Hostname}#]
[label=get_configs]
ping[prompt=Protocol]
10.116.128.1[prompt=Repeat count]
{cr}[prompt=Datagram size]
{cr}[prompt=Timeout in seconds]
{cr}[prompt=Extended commands]
y[prompt=Source address or interface]
loopback0[prompt=Type of service]
{cr}[prompt=Set DF bit in IP header]
{cr}[prompt=Validate reply data]
{cr}[prompt=Data pattern]
[exit]
```

Audit templates may be similar to the configuration templates in that they may contain network device configuration commands and variable names instead of actual values. However, their use is not to generate configurations, but to match the actual configuration of the devices (e.g., show run) and optionally to extract the matching values from configuration files and place them in the spreadsheet.

For example, consider the following Audit template:

```
interface Serial{Interface Number}
  ip address {Secondary IP} {Secondary Mask} secondary
  ip address {Primary IP} {Primary Mask}
```

When an audit is performed using the above exemplary audit template, the configuration of one or more devices may be examined against the template. The computer 120 may find the first occurrence of an interface which starts with the string "Serial". Immediately following the string "Serial" may be another string containing the interface number (e.g. 0/0.102). There may be nothing following the interface number on that line. The computer 120 may then looks for a statement matching the secondary IP address. Lastly, the computer 120 may look for the primary IP address line. Using this method, the configuration of one or more of the devices (show runs) can be checked against one or more patterns.

At the end of the Audit process, the highlighted variables may be checked against one or more columns in the device sheet. If a matching column is found, then the actual value matching the variable name may be extracted and placed under the column in the device sheet. This may provide the means for parsing the configuration of a device for values which are not parsed by the standard parser (i.e., an ad-hoc parser).

The audit template can contain several useful directives to perform complex audits, such as, for example, {variable_name}. The variable_name may be a place holder for what is matched between the template and the actual config file.

Example: router bgp {AS#}

The above line may find the beginning of the BGP configuration and catch the actual AS# {=variable_name}

The equal sign in front of the variable name may instruct a module of code executed by the computer that instead of matching a string from the actual configuration, the variable_name refers to a column in the Device Sheet. The computer 120 may replace this directive with the contents of the cell from the Device Sheet and then perform the audit.

Example: router eigrp {=EIGRP AS #}

Assuming that there is a column in the Device Sheet with the name 'EIGRP AS #', the computer 120 may find the value from that column for the device being audited, (b) replace the {=EIGRP AS #} with the contents of the found cell and (c) perform the audit.

The [skip] directive tells the computer 120 that the current line in the template is optional.

Example:

```
interface {interface_name}
  ip address {Primary IP} {Primary Mask}
  ip address {Secondary IP} {Secondary Mask} secondary [skip]
```

The above template may find the first interface that has a primary address. Optionally, the interface can have a secondary address as well.

The [reject] directive tells the computer 120 that the current line in the template may not occur in the configuration.

Example:

```
interface {interface_name}
  ip address {Primary IP} {Primary Mask}
  ip address {Secondary IP} {Secondary Mask} secondary [skip]
  shutdown[reject]
```

The above template may find the first interface that has a primary address. Optionally, the interface can have a secondary address as well, but the interface may not be shut down.

Configuration templates may contain device configuration commands that are enhanced by the usage of Variables.

Configuration templates may be defined in the 'Templates' sheet. Each column in that sheet contains one or more of the commands for a single template. There may be two types of configuration templates: Partial (simple) Configuration Templates and Complete (complex) Configuration Templates.

Some projects may require only a partial configuration template. For example, implementing multicast on the existing routers. Partial configuration templates may tend to be relatively small and simple. Partial configuration templates may utilize variables to generate network device specific configurations, but in general the structure of the template may be substantially the same for one or more of the devices.

New devices may require complete configuration templates. Such templates may often be complex in that the structure of the template depends on some design decisions. For example, a device may include additional backup network connectivity such as, ISDN, VPN or no backup mechanism. Some devices may require HSRP (Hot Standby Router Protocol) while others may need QOS (Quality of Service) configuration. These variations require additional configuration commands depending on the choices made by the engineer. To accommodate these scenarios, a simple mechanism may be deployed in the template. A template can contain the following directive:

[include=another_template]

This statement may pull in the contents of another template. A key components that makes this mechanism flexible may be that the new template name may contain a variable name:

[include={Backup Method}_template]

In this example, the variable {Backup Method} may determine the backup template that may be included. The following example depicts this scenario:

```
Main_template
  [include={Backup Method}_template]
ISDN_template
  username wilson-chx-123456 password
  !
  interface Serial1/0:23
    no ip address
    encapsulation ppp
    dialer pool-member 1
    isdn switch-type primary-4ess
    isdn bchan-number-order ascending
    ppp authentication chap
    ppp multilink
  !
  interface Dialer3
    ip address 10.20.100.11 255.255.255.252
    encapsulation ppp
    dialer pool 1
    dialer remote-name wilson-chx-532769
    dialer idle-timeout 0
    dialer load-threshold 128 either
    no peer neighbor-route
    ppp authentication chap
    ppp multilink
VPN_template
  Interface {Management Interface}
    Ip address {Management IP} 255.255.255.255
    [include={Backup Method}_template]
```

Some of the lines in the configuration template may be skipped if there are variables on the line that cannot be resolved to a value. For example, the line pertaining to the secondary IP address may be skipped if the value of the variable {Secondary IP} cannot be determined. The keyword [skip] may accomplishes:

```
Interface {interface_name}
  Ip address {Primary IP} {Primary Mask}
  Ip address {Secondary IP} {Secondary Mask} secondary [skip]
```

Sometimes it is desirable to skip a line if the variable(s) are in fact evaluated to a value. This is the reverse of the situation described in the above section. The keyword [reject] accomplishes this:

```
Interface loopback0
  Ip address {Primary IP} {Primary Mask}
  Ip address {Secondary IP} {Secondary Mask} secondary [reject]
```

Many times a template may provide the configuration for the devices at both ends of a network connection.

Another type of template may be a Script Template. For example, a template that performs a simple test and records the outcome of the test is illustrated below. In this scenario the template issues the command:

jsmith-xxxx-yyyyyyy>ping 10.1.1.1

The successful response to the ping is:

```
Type escape sequence to abort.
Sending 5, 100-byte ICMP Echos to 10.1.1.1, timeout is 2 seconds:
!!!!!
Success rate is 100 percent (5/5), round-trip min/avg/max =
256/258/264 ms jsmith-xxxx-yyyyyyy >
```

To check for the successful response to the ping, the template may be instructed to check for the string 'round-trip' as an indication that at least one of the pings was successful, otherwise the ping may be considered a failure. This may be done through the use of directives. Directives may be template instructions imbedded within the actual device configuration commands that may define the proper responses, timeouts, and actions to be taken in the event of a successful and/or a failed response. Here is the script that performs the above test:

```
ping 10.1.1.1 [response=round-trip][jump=success]
[output=Device {Device Name} could not ping the server]
[exit]
[label=success]
[output=Device {Device Name} can ping the server]
```

The first line of the above script includes the actual ping command followed by two directives:

ping 10.1.1.1 [response=round-trip][jump=success]

The first directive defines the string that may be included in the response from the router, namely round-trip. The second directive instructs the template to jump forward to the label success if the first directive is successful. If the first directive is not successful, then the template simply continues to the next line.

Scripts may contain a variety of variables and directives to customize the contents of a template and to control the actual delivery of the template. In general, variables may be column names from the device sheet which are enclosed in brackets { }. Directives may be instructions that are enclosed in square brackets [ ]. The following sections contain a list of some of the variables and special variables used by the system.

Script Template Directives

| | |
|---|---|
| [caption=label] | This directive may set the SecureCRT window caption. |
| [debug=value] | This directive may enable or disable debugging. Acceptable values may include True or False. |
| [default_prompt=text] | This directive may define the default prompt. |
| [default_timeout=seconds] | This directive may define the default timeout in seconds. |

-continued

| | |
|---|---|
| [delete=value] | This directive may delete files before exiting. The value may be one of the following: script, commands, both, none. |
| [error=value] | This directive may exit (or continues) if a syntax error is encountered. Value can be: exit, continue. |
| [exit] | This directive may immediately exit the SecureCRT session. |
| [interactive=value] | This directive may turn interactive mode on or off. The value can be: on, off. |
| [jump=label] | This directive may jump to (continue processing of a script at) the label. |
| [label=label] | This directive may define a label. It may be used in conjunction with the [jump] statement. |
| [logfile=filename] | This directive may open a log file named filename. |
| [message=string] | This directive may send a message to the screen and waits for user acknowledgement. |
| [outfile=filename] | This directive may open an output file named filename. |
| [output=string] | This directive may output a string to the output file. |
| [prompt=else] | This directive may define the condition where the actual prompt did not match one or more of the given prompts. |
| [prompt=text] | This directive may define one of the expected prompts. |
| [remark string] | This directive may provide an ability to enter a comment or remark in a script without the attempted execution of the comment or remark. The remark line is ignored by a script interpreter. |
| [response=else] | This directive may define the condition where the actual response did not contain one or more of the given responses. |
| [response=text] | This directive may test the actual response against the given text. |
| [ssh=session_name] | This directive may establish an SSH session using the pre-defined session_name. |
| [connect=/telnet ip port] | This directive may telnet to an IP address via the specified port. |
| [state=window_state] | This directive may set a window state. The window state can be hide, show or minimize. |
| [timeout=seconds] | This directive may wait for the specified number of seconds to receive the prompt. |
| [wait=seconds] | This directive may wait the specified number of seconds before proceeding. |

Configuration Template Directives

| | |
|---|---|
| [include=template_name] | This directive may include another template in this template. |
| [interactive=value] | This directive may turn interactive mode on or off. The value can be: on, off. |
| [skip] | This directive may skip this line if one or more of its variables has an unknown value |
| [configfile=file_name] | This directive may be the first line. This directive may set the export file name. |

Parser Directives (.OUT Files)

| | |
|---|---|
| [sheet=sheet_name] | This directive may select a specific sheet from the spreadsheet. |
| [column_name=value] | For the first occurrence of a value this directive may find a specific row with value in column column_name. |
| [column_name+=value] | For the second occurrence of a value this directive may set/append given value to the cell under column_name. |

-continued

| | |
|---|---|
| [newline=value] | This directive may insert a new line in the sheet and set the value of the first column. |
| [audit=device_name:pattern] | This directive may audit/parse the output of a command for a particular device. |

Audit Template Directives

[skip] This directive may skip this line in the template if no match is found and continue with the rest of the audit (i.e. optional line).

[reject] This directive may specify that the corresponding specified line from the template should NOT occur in the actual config. (i.e. the audit fails if this line is found).

Special Variables

| | |
|---|---|
| {prompt} | This variable may be replaced by the actual prompt (after command execution). |
| {response} | This variable may be replaced by the actual response to the command (after command execution). |
| {default_prompt} | This variable may be replaced by the default prompt. |
| {default_timeout} | This variable may be replaced by the default timeout. |
| {External System 1 Username} | |
| {External System 1 Password} | These variables may be special variables which may be replaced by the value in the encrypted file. |
| {TACACS Username} | |
| {TACACS Password} | These variables may be special variables which may be replaced by the value in the encrypted file. |

| | |
|---|---|
| {Enable Password} | |
| {Previous Enable} | These variables may be special variables which may be replaced by the value in the encrypted file |
| { External System 2 Password} | This variable may be a special variables which may be replaced by the value in the encrypted file. |
| {Domain} | External System 1 domain. This variable is listed on the Network sheet of the Automation Spreadsheet. |
| { External System 1 Prompt} | Expected prompt of the External System 1 system for the specified domain. This variable is listed on the Network sheet of the Automation Spreadsheet. |
| {cr} | This variable may be replaced by a carriage-return |
| {lf} | This variable may be replaced by a line-feed |
| {^z} | This variable may be replaced by a control-Z |
| {esc} | This variable may be replaced by the Escape character |

Certain rules/standards may be used within an automation spreadsheet. These rules may be relied upon by the custom programs and an automation spreadsheet and should not be changed in a manner that violates these standards.

The following contains the list of the sheets in the Automation spreadsheet. These sheets may not be deleted. The user may add additional sheets if desired. The Main sheet displays details about a given device. The Main sheet displays the contents of a template, after it has be evaluated for the shown device. The Network sheet contains system related information. The network sheet should not be altered by the user. The device sheet contains the current list of known devices. The Interface sheet contains a list of one or more primary interfaces for one or more devices. The secondary sheet contains a list of one or more secondary interfaces for one or more devices. The NAT sheet contains Network Address Translation information for one or more devices. The ACL sheet contains access control list information for one or more devices.

Formulas may be generally disabled from auto-calculation. This may prevent excessive delays after each key-stroke. Instead of entering formula on each cell, a formula may be entered for an entire column on row #1 of that column. Following is a sample formula:

{interface.Interface Name}[filter=LAN IP]

In this example, the LAN interface column is calculated as the column. Interface.Interface Name. That is the 'Interface Name' column from the 'Interface' sheet. However, since there may be many interfaces under a given device, the filter LAN IP is used to identify the specific interface desired in the formula. Please note that an equal sign '=' does not precede the formula as is customary in some spreadsheet formulas.

The top 3 rows in each sheet may be reserved according to one of more of the following rules:

Row #3 may be used for the title of the corresponding column.
Row #2 may be used to indicate choices for the corresponding column.
Row #1 may be used to indicate the formula for calculating the corresponding column.

In the following example column F is titled *Encapsulation Type and it can have a value of Frame Relay or MLPPP and is calculated by looking into the Interface sheet, under the column Encapsulation.

{interface.Encapsulation}[filter=serial_sub_intf]

Column names may contain one or more strings of characters (including spaces and special characters). However, in some embodiments, a column name may not be blank. A blank column name may indicate the end of the sheet and one or more other columns to the right of the blank may be ignored.

The initial set of columns provided by the spreadsheet may not be changed or deleted. Additional columns can be added to one or more sheets.

The Automation Spreadsheet may contain a module for assisting the Management Take Over (MTO) process for a new network. The algorithm used by the Management Take Over (MTO) module is described below.

Some assumptions may be made in formulating the MTO algorithm: the customer has provided one or more of the 'Show Run' and the 'Show Version' listings for one or more of the devices that may be managed. The specified choice for interface management may already be known. Manage one or more of the interfaces via SNMP and ICMP (i.e. secondary addresses for one or more of the managed interfaces—Some external systems may require this). Manage the loopback interface via SNMP and ICMP. Manage one or more other interfaces via SNMP only (i.e. no secondary addresses may be required for these interfaces).

The new network may be implemented in a Private IP (PIP) environment. The existing algorithm may use this assumption to identify a Customer Edge (CE) router, adjust the BGP routing protocol, etc. However, the algorithm may be easily modified for other environments and routing protocols.

The steps for assigning the IP addresses and generating the configuration changes required for the Management Take Over (MTO) are as follows: the first step in the Management Take Over (MTO) calculations may be to identify the sites. A site may contain a group of devices that are co-located in one LAN environment. These devices can be connected to each other directly or indirectly with one or more devices in between them. One or more of the devices may be connected via LAN interfaces. The Automation spreadsheet may find such sites and may automatically group the devices accordingly. There may be situations where devices in the same site may not follow the above rule. The spreadsheet may provide the means to override this rule and manually identify the devices in one site.

Having found one or more of the sites, the next step may be to (for each site) find one or more of the independent subnets and count the directly adjacent devices for each subnet. For example, a Subnet A may contain two directly adjacent devices and a Subnet B may includes three directly adjacent devices. By counting the number of directly adjacent devices on each subnet the system may then determine the mask for assigning secondary IPs to the respective devices (interfaces). In the above example, the mask for Subnet A is /30 and for Subnet B is /29.

Often a customer may provide partial configuration file at the beginning of the project and as time goes by they may provide the missing files. Not having one or more of the configuration files may result in under-calculating the subnet masks (and summary addresses) for each site. The Automation Spreadsheet may take this scenario into consideration.

The entire site may be re-calculated (i.e. new secondary's, BGP network addresses, etc.) The existing calculations can be preserved (i.e. if the site was already subject to a Management Take Over (MTO)). The new device(s) in the existing site may necessitate assignment of new independent management subnets (BGP network addresses, etc.) and may invalidate the previously defined summary address for that site. In this situation the affected site may have more than one summary address.

At this point we may determine the overall (management) summary address for each site. In one or more embodiments, a minimum pre-determined summary range may be used, say a /27 range for each given site regardless of the actual number of IPs needed. This may provide future growth and may allow better troubleshooting capabilities.

According to one or more embodiments, if the number of sites is large and the number of devices are not uniform, to preserve the number of management IPs used by each site, a variable summary address for each site may be utilized.

The Automation spreadsheet may perform the Management Take Over (MTO) calculations for each of the above mentioned scenarios.

For each managed interface, the secondary IP address may now be generated, which may maintain the subnet adjacencies that were found in the previous steps.

The system may generate one or more new network statements or combinations of a plurality of network statements. At the CE router(s), the BGP routing process may be modified to allow the new management subnets (network addresses) to be advertised into the Private IP (PIP) cloud.

The system may modify one or more existing Access Control Lists (ACLs) to adjust route advertisement. There may be existing ACLs that control what is being allowed into the PIP cloud. In addition to the new Network Statements, one or more existing ACLs may be identified and modified to allow the net networks.

The end result of the process outlined above may incorporate the calculated data in a template and may generate the configuration commands for one or more of the devices on a site by site basis. The generated configuration commands may be complete and ready for delivery to the end devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A computer-implemented method, comprising:
receiving network device information associated with a network device located within a network;
parsing the network device information;
identifying one or more network device attributes associated with the network device from the parsed network device information;
displaying, via a user interface, at least one of one or more identified network device attributes;
requesting additional network device information to identify one or more network device attributes;
analyzing at least one of the network device information and the additional network device information to identify one or more non-compliant devices based on at least one user-specified setting, wherein the at least one user-specified setting is determined by a user via a translatable template;
receiving one or more user commands via the user interface;
translating, by a command interpreter module, the one or more user commands into one or more network device executable commands; and
generating one or more configuration commands to configure one or more network devices.

2. The computer-implemented method of claim 1, wherein at least one network device attribute comprises network connectivity of the network device.

3. The computer-implemented method of claim 1, further comprising:
accessing one or more network devices via a network to obtain network device information.

4. The computer-implemented method of claim 3, further comprising authorizing access with one or more access control mechanisms prior to accessing one or more network devices remotely.

5. The computer-implemented method of claim 4, wherein at least one of the one or more access control mechanisms comprises an authentication server.

6. The computer-implemented method of claim 1, wherein the network device information is received as one or more network device configuration files.

7. The computer-implemented method of claim 1, wherein the one or more devices comprise devices on a client network managed by a service provider.

8. The computer-implemented method of claim 1, further comprising utilizing a template to generate the request for additional network device information.

9. The computer-implemented method of claim 1, wherein additional network device information is parsed from configuration files.

10. The computer-implemented method of claim 1, wherein additional network device information is queried from one or more network devices.

11. The computer-implemented method of claim 1, wherein the one or more configuration commands are generated to reconfigure one or more identified non-compliant devices.

12. The computer-implemented method of claim 1, further comprising:
delivering one or more configuration commands to one or more network devices via a network.

13. The computer-implemented method of claim 1, further comprising:
providing one or more configuration commands to a user.

14. The computer-implemented method of claim 2, further comprising:
utilizing analyzed network connectivity of one or more network devices to provide one or more network address management services.

15. A non-transitory computer readable media comprising code to perform the acts of the computer-implemented method of claim 1.

16. The method of claim 1, wherein the additional network device information provides a more detailed view of the one or more network device attributes than the network device information.

17. A system, comprising:
organized data storage for storing network information; and
a processor wherein the processor is configured to:

receive network device information associated with a network device located within a network;

parse the network device information;

identify one or more network device attributes associated with the network device from the parsed network device information;

display, via a user interface, at least one of the one or more identified network device attributes;

request additional network device information to identify one or more network device attributes;

analyze at least one of the network device information and the additional network device information to identify one or more non-compliant devices based on at least one user-specified setting, wherein the at least one user-specified setting is determined by a user via a translatable template;

receive one or more user commands via the user interface;

translate, by a command interpreter module, the one or more user commands into one or more network device executable commands; and generate one or more configuration commands to configure one or more network devices.

18. The system of claim 17, wherein at least one network device attribute comprises network connectivity of the network device.

19. The system of claim 17, wherein the translation of the user interface enables a user to access network device information utilizing a standardized command syntax.

20. The system of claim 17, wherein the additional network device information provides a more detailed view of the one or more network device attributes than the network device information.

* * * * *